United States Patent
Vedovello

(10) Patent No.: US 7,102,261 B2
(45) Date of Patent: Sep. 5, 2006

(54) COUPLING DEVICE BETWEEN A ROTOR OF PERMANENT-MAGNET SYNCHRONOUS MOTOR AND A WORKING PART

(75) Inventor: Elena Vedovello, Dueville (IT)

(73) Assignee: Artel s.a.s. di Vedovello Elena & C., (IT)

( * ) Notice: Subject to any disclaimer, the term of this patent is extended or adjusted under 35 U.S.C. 154(b) by 0 days.

(21) Appl. No.: 11/024,611

(22) Filed: Dec. 29, 2004

(65) Prior Publication Data

US 2005/0140221 A1    Jun. 30, 2005

(30) Foreign Application Priority Data

Dec. 31, 2003  (EP) .................................. 03425830

(51) Int. Cl.
*H02K 7/10* (2006.01)
(52) U.S. Cl. .................... 310/75 D; 310/75 R; 310/80; 464/73
(58) Field of Classification Search ............. 310/75 D, 310/80, 84, 75 R, 79, 96; 417/423.6
See application file for complete search history.

(56) References Cited

U.S. PATENT DOCUMENTS

| | | | | |
|---|---|---|---|---|
| 4,750,872 A | * | 6/1988 | Palliser .................. | 417/423.11 |
| 4,861,240 A | * | 8/1989 | Marioni et al. .......... | 417/423.3 |
| 5,152,189 A | * | 10/1992 | Miura et al. ............. | 464/180 |
| 5,668,425 A | * | 9/1997 | Marioni et al. ........... | 310/162 |
| 5,873,786 A | * | 2/1999 | Hosoya et al. ............ | 464/73 |
| 6,217,452 B1 | * | 4/2001 | Marioni .................. | 464/74 |
| 6,384,508 B1 | * | 5/2002 | Marioni .................. | 310/261 |
| 6,685,446 B1 | * | 2/2004 | Marioni .................. | 417/423.7 |
| 2003/0081994 A1 | * | 5/2003 | Marioni .................. | 403/299 |

FOREIGN PATENT DOCUMENTS

WO    WO 99/48189    9/1999

* cited by examiner

*Primary Examiner*—Burton Mullins
(74) *Attorney, Agent, or Firm*—Akerman Senterfitt

(57) ABSTRACT

A coupling device (11) between a rotor of a synchronous permanent-magnet motor and a working part (17), being advantageously able to ensure an unusual silentness, comprises a driving member (22), being eccentric with respect to the rotor rotation axis and integral with a first motion transmission component, and a driven element (24), being also eccentric with respect to the rotor rotation axis and integral with a second motion transmission component which is kinematically positioned in series with the previous one, said driving (22) and driven (24) members being placed on different non interfering parallel planes inside a tight chamber (18), said driving (22) and driven (24) members being operatively connected through kinematic connection means (25) whose axial dimension interferes with said parallel planes in said chamber (18), said kinematic connection means (25) comprising at least one elastic element (25*a*) being compressed in said chamber (18) between a bottom wall (19*a*) and a closing tight cover (19*b*).

19 Claims, 2 Drawing Sheets

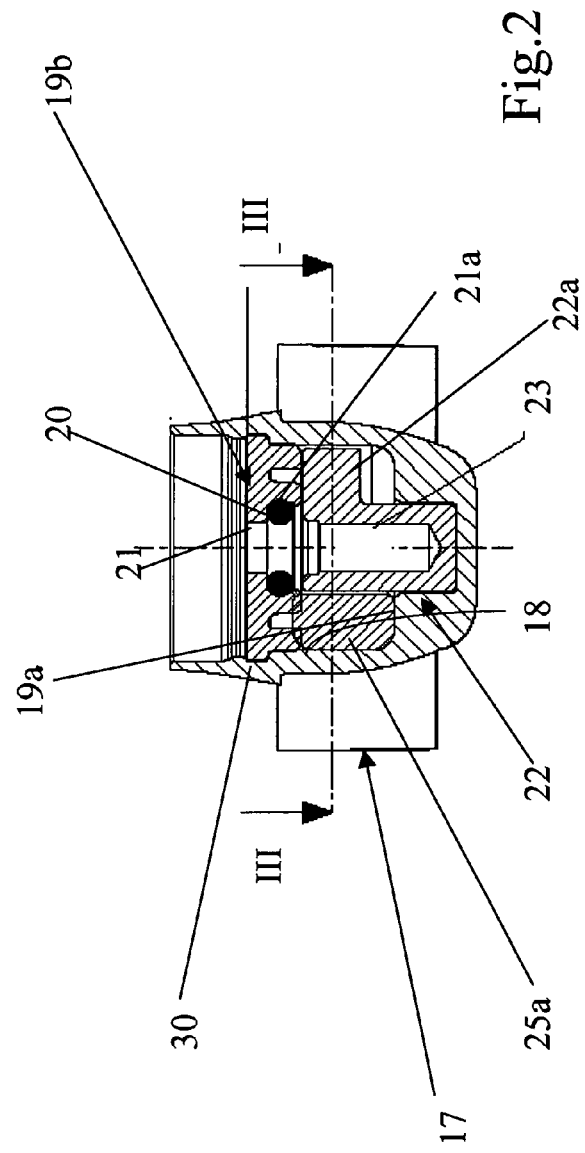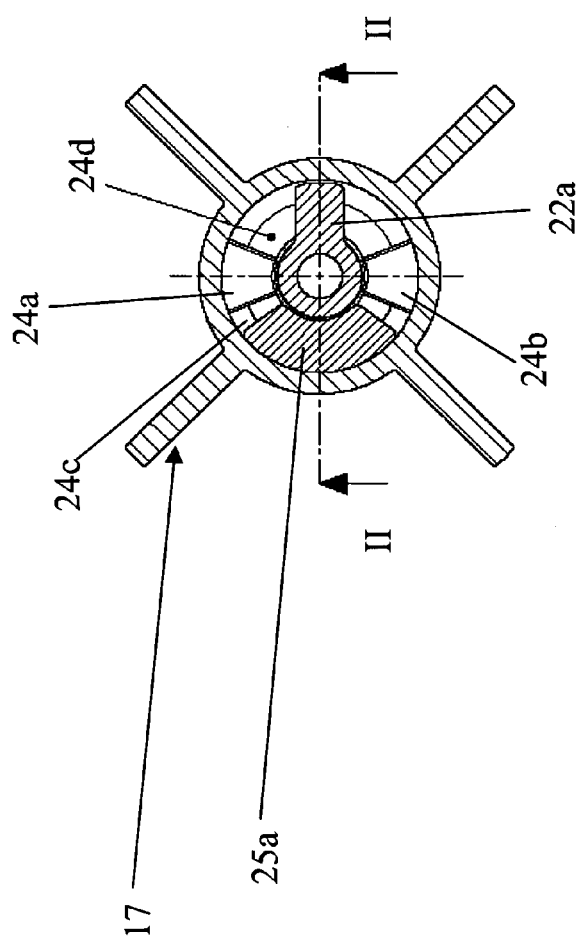

COUPLING DEVICE BETWEEN A ROTOR OF PERMANENT-MAGNET SYNCHRONOUS MOTOR AND A WORKING PART

FIELD OF APPLICATION

The present invention relates, in its more general aspect, to a coupling device between a rotor of a permanent-magnet synchronous motor and a working part.

In particular, this invention relates to a coupling device, between a rotor of a permanent-magnet synchronous motor and a working part, of the type comprising a driving member, being eccentric with respect to the rotor rotation axis and integral with a first motion transmission component, and at least one driven element, being also eccentric with respect to the rotor rotation axis and integral with a second motion transmission component which is kinematically positioned in series with the previous one, said driving and driven members being placed on different non interfering axial positions of a path area of said driving and driven members being placed on different and non interfering parallel planes in a tight chamber.

PRIOR ART

It is well known that permanent-magnet electric motors have a structural scheme comprising a stator, with lamination-packed electromagnet and corresponding windings, and a permanent-magnet rotor placed between at least two stator poles defined by the stator.

The rotor is axially crossed by an axis, integral therewith, rotatably connected to a bearing structure.

It is also known that the synchronous motor start-up is the harder the higher is inertia of the load applied thereto.

In fact, the start-up is a transient process wherein the direction of rotation, speed and current change until the synchronism is reached.

In this transient process, a rotor oscillation is determined as effect the alternating magnetic field generated by the stator which, by inducing a torque on the permanent-magnet rotor, tends to bring it into a position wherein the rotor magnetic field itself is aligned with the stator field.

If, during this "hunting" oscillation, the rotor acquires kinetic energy enough to succeed in moving just a trifle out of its aligned position, it undergoes an additional acceleration forcing it to perform another rotation portion and so on until the synchronism state is reached.

At present, mechanical couplings inserted between the load and the rotor are widely used in order to allow the rotor to freely oscillate for a certain rotation angle in the start-up step.

This is the case of the so-called tooth couplings, wherein a first tooth, which is called driving tooth and eccentric with respect to the rotation axis, is integral with a rotor axis end, while a second tooth, which is driven and also eccentric with respect to the rotation axis, is integral with the load.

In this way, during the start-up transient the rotor is relieved from the load inertia, thus helping in reaching the synchronism state.

A free rotation through a given angle (typically of 180 sexagesimal degrees) then occurs before the impact among the teeth when the load is coupled: a direct connection thus occurs between the load and the rotor which, in the rate running, are substantially made integral.

Thus, the free rotation transient enables the motor to reach the synchronism state and to develop a torque such as to be able to overcome the moment of inertia of the load on starting.

A coupling device between the rotor of a synchronous permanent-magnet motor and the working part is known, which is disclosed in the European patent no. 0 983 630 in the name of this Applicant. This device comprises at least two driving couplings which mutually co-operate in a kinematic series.

Each coupling comprises a driving member which is eccentric with respect to the rotation axis and integral with a motion transmission component and a driven member, which is also eccentric with respect to the rotation axis, integral with a component being kinematically placed in series with the previous one.

The driving and driven members are placed on different non interfering axial positions and an intermediate transmission component, incorporating both a driven member and a driving member, is interposed to realise the kinematic connection: this intermediate component has an axial dimension being suitable to interfere with the paths of both members.

In the practical realisation, the component interposed between the driving and driven members is composed of a single elastic rubber element.

Although advantageous under different points of view, the coupling devices between a rotor of a synchronous permanent-magnet motor and a working part being structured in the above schematically described way have known drawbacks.

For example, a major problem which arises is that of the very high rotor accelerations (ranging around 16,000 rad/sec$^2$) causing shocks between the driving member, the elastic element and the driven member. The shock wave propagating inside the elastic element causes the premature failure thereof.

Another drawback of known coupling devices is that they involve an acoustic efficiency level, i.e. a silentness level, which is often not suitable to the uses, and this both in the motor start-up and during the running.

SUMMARY OF THE INVENTION

The problem underlying the present invention is that of devising a coupling device between a rotor of a synchronous permanent-magnet motor and a working part, being able to meet the above-mentioned requirement, meanwhile overcoming, in a simple and economical way, all the drawbacks mentioned with reference to the prior art.

This problem is solved, according to the present invention, by a device as above mentioned and characterised in that said driving and driven members are operatively connected through kinematic connection means whose axial dimension interferes with said parallel planes in said chamber and in that said kinematic connection means comprise at least one elastic element being compressed in said chamber between a bottom wall and a closing tight cover.

Further features and the advantages of the coupling device between a rotor of a synchronous permanent-magnet motor and a working part according to the present invention will be more apparent from the description of an embodiment thereof, made hereafter with reference to the attached drawings given by way of indicative and non-limiting example.

BRIEF DESCRIPTION OF THE DRAWINGS

FIG. 2 is a schematic diametrical section view (along the line II—II of FIG. 3) of the device of FIG. 1.

FIG. 3 is a schematic cross-sectional view (along the line III—III of FIG. 2) of the device of FIG. 1.

DETAILED DESCRIPTION OF A PREFERRED EMBODIMENT

Figure 1:
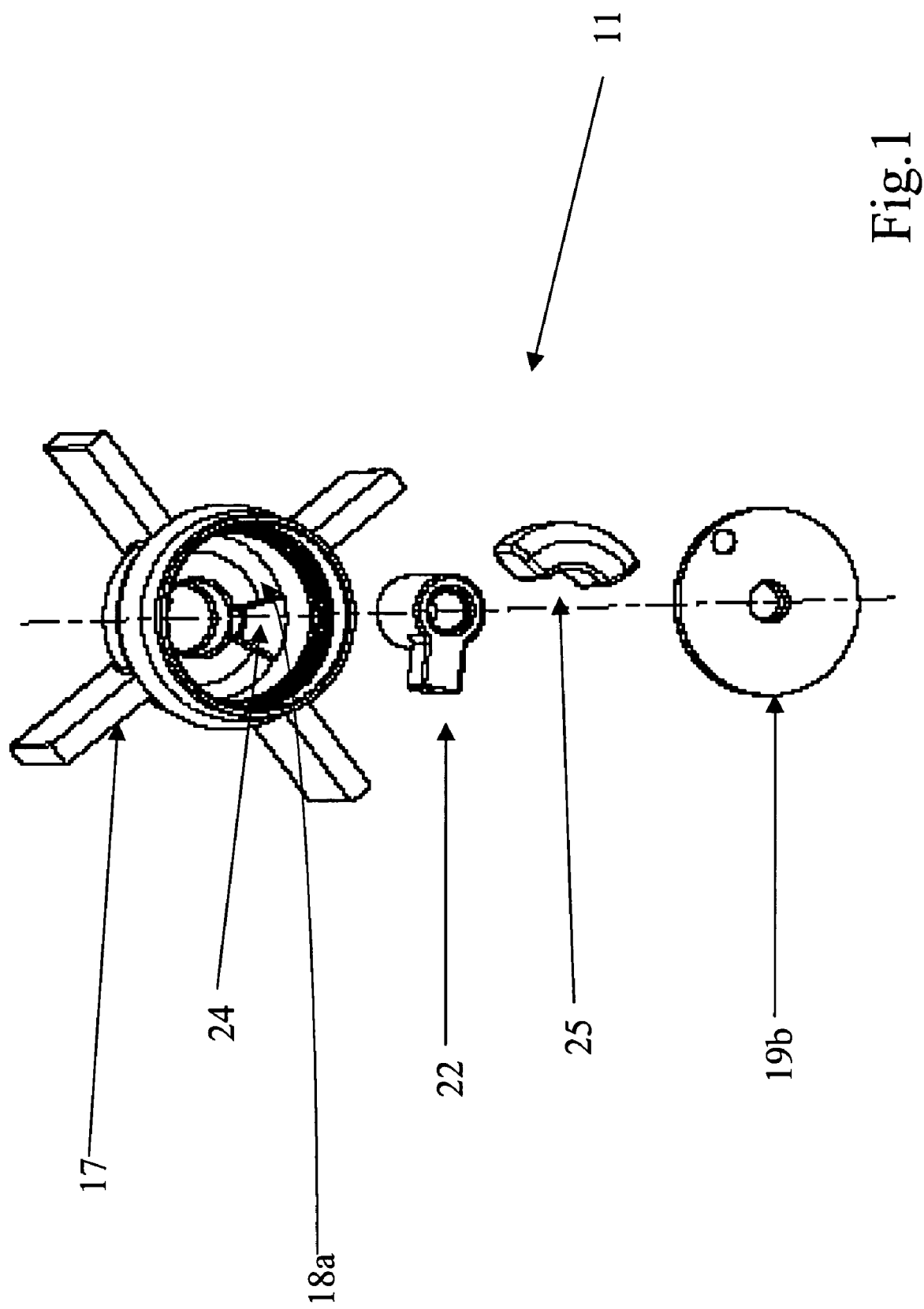
FIG. 1 is a schematic exploded view of a coupling device between a rotor of a synchronous permanent-magnet motor and a working part according to the invention.

With reference to the figures, according to the present invention, a coupling device, globally indicated with 11, between a rotor of a synchronous permanent-magnet motor and a working part, for example a centrifugal pump impeller 17, is shown.

The rotor, not shown in the figures, generally comprises a cylindrical ring-like permanent magnet whereon a plastic-material element defining an inner tang and end flanges is overprinted.

The rotor has thus an overall cylindrical shape, with an axial hole wherein a shaft is integrally inserted.

The coupling device 11 according to the invention is between the rotor, and consequently between the shaft being integral therewith, and the centrifugal pump impeller 17.

The coupling device comprises a driver or driving member 22 and at least a driven member 24, housed in a tight chamber 18 made in the impeller 17 and closed by a closing tight cover 19b.

More particularly, the driven member comprises a first 24a and a second tooth 24b being formed bodily with the impeller 17 and projecting from a bottom wall 19a of the chamber 18 in a diametrically opposite position.

The chamber 18 develops from the impeller 17 towards the rotor and it defines a substantially cylindrical path area 18a being comprised between the bottom wall 19a and the cover 19b which is generally circular.

A ring-like gasket 20, housed in a seat 21a of the cover 19b, around a central hole 21 of the cover 19b itself, ensures the chamber 18 tightness. The rotor shaft passes through the hole 21.

The driving member 22 is eccentric with respect to the rotor rotation axis and it comprises a first tooth 2a developing from a keyed tang 23 on the shaft end inside the chamber 18.

The first tooth 22a is thus integral with a first motion transmission component formed by the rotor.

The driven member 24, which is also eccentric with respect to the rotation axis, comprises the teeth 24a and 24b monolithically developing from the bottom wall 19a of the chamber 18 and being thus integral with a second motion transmission component kinematically placed in series with the previous one, which is formed in the example by the impeller 17.

The teeth 22a and 24a, 24b are placed on different non interfering parallel planes. More particularly, the teeth 22a and 24a, 24b are operatively connected only through kinematic connection means 25 whose axial dimension interferes with said parallel planes in said path area 18a.

In particular, according to an aspect of the present invention, these kinematic connection means 25 comprise at least an elastic element 25a, preferably made of rubber or syn-thetic-plastic material, placed in said path area 18a of said teeth 22a and 24a, 24b of the driving 22 and driven 24 members. Moreover, the elastic element 25a is compressed in the chamber 18 between the bottom 19a and the cover 19b.

The elastic element 25a is preferably housed in a cylindrical crown portion 24c between the teeth 24a and 24b (in the case shown in the figures, the angular amplitude of said portion is slightly higher than a right angle). This elastic element 25a has also rounded edges, as it can be seen in FIG. 1).

The angular dimension of the teeth 22a and 24a, 24b is limited in order to leave a suitable space for the elastic element 25a positioning. More precisely, the elastic element 25a is placed in the chamber 18 in a cylindrical crown portion 24c with a higher angular amplitude than the elastic element 25a dimension.

In an alternative embodiment, not shown in the figures, the angular amplitude of the two cylindrical crown portions 24c and 24d being delimited between the teeth 24a and 24b can be different, for example the portion 24d can have a higher angular amplitude than the opposite portion 24c housing the elastic element 25a.

In the example of the figures, a lubricant, preferably oil, for example silicone oil with a fluidity of 5000 cST, is conveniently poured into the portion 24d.

Concerning the compression of the elastic element 25a in said path area 18a between said bottom 19a and said cover 19b, it is specified that, in the example shown in the figures, the cover 19b is snap-inserted in a circumferential recess 30 placed at one end of the chamber 18 at a height, with respect to the bottom 19a, being lower than the axial development of the elastic element 25a, so as to exert a slight compression thereof. The cover 19b is integral with the impeller 17.

An assembly and the operation of the coupling device between a rotor of a synchronous permanent-magnet motor and a working part according to the present invention are specified hereafter.

The elastic element 25a is first housed in one of the two cylindrical crown portions 24c and 24d defined between the two teeth 24a and 24b. If one of the two portions has a lower angular amplitude, the element 25a is housed in that portion.

The tang 23 is freely inserted in the chamber 18 with the first tooth 22a being free to rotate above the teeth 24a and 24b.

At this point the cover 19b is snap-inserted in the recess 30, the elastic element 25a being thus slightly compressed, as shown in FIG. 2.

The tang 23 can be accessed through the hole 21 of the cover 19b for a following assembly on the free end of the driving shaft, for example by interference keying.

Concerning the operation, it is enough to say that the rotor shaft rotation brings the first tooth 22a in contact with the elastic element 25a, after a free rotation which can also exceed 180 sexagesimal degrees. After the impact, the elastic element 25a can cover, with a friction due to the compression, a small angular section before contacting one of the teeth 24a, 24b. In practise, an elastic system is realised, which is able to progressively dampen the shock between the teeth 22a and 24a, 24b, the latter two thereof being initially standstill.

The elastic element 25a, undergoing a compressive force and the shearing force of the teeth 22a and 24a, 24b, distributes the impact energy in the so-compressed volume thereof. Test results show that this striking energy is distributed in a better way with respect to the known art and, meanwhile, also the shock wave reflection is dampened in a more effective way.

The main advantage reached by the coupling device between a rotor of a synchronous permanent-magnet motor and a working part according to the present invention is that it unusually limits the possible failure of the elastic element, thus ensuring a very high reliability standard.

Another advantage of the coupling device between a rotor of a synchronous permanent-magnet motor and a working part according to the present invention is to ensure an excellent silentness, both at the start-up and during the operation for the whole motor life.

Another advantage of the coupling device between a rotor of a synchronous permanent-magnet motor and a working part according to the present invention is to be of simple construction and reduced size.

A further advantage of the coupling device between a rotor of a synchronous permanent-magnet motor and a working part according to the present invention is to allow the rotor shaft, before reaching the elastic element, to have a rotation freedom for an angle exceeding the 180 sexagesimal degrees being usually used in the prior art, thus definitely lowering the required motor starting torque, consequently allowing the use of a less powerful motor.

A still further advantage of the coupling device between a rotor of a synchronous permanent-magnet motor and a working part according to the present invention is to allow a simple oil to be used as a lubricant, and it does not require the use of fat as it happens in prior art devices.

Obviously, in order to meet specific and contingent requirements, a skilled in the art could bring several changes to the above-described coupling device between a rotor of a synchronous permanent-magnet motor and a working part, all however comprised in the scope of protection of the present invention, as defined in the following claims.

The invention claimed is:

1. A coupling device between a rotor of a synchronous permanent-magnet motor and a working part, of the type comprising a driving member, eccentric with respect to the rotor rotation axis and integral with a first motion transmission component, and at least one driven element, which is also eccentric with respect to the rotor rotation axis and integral with a second motion transmission component which is kinematically positioned in series with the previous one, said driving and driven members placed on different and non interfering parallel planes in a chamber, wherein said driving and driven members are operatively connected through kinematic connection means whose axial dimension interferes with said parallel planes in said chamber, and wherein said kinematic connection means comprises at least one elastic element which is slightly compressed in said chamber between a bottom wall and a closing cover.

2. A coupling device according to claim 1, wherein said chamber extends from the working part towards the rotor and it defines a substantially cylindrical path area between the bottom wall and the cover which is circular.

3. A coupling device according to claim 2, further comprising a ring-like gasket housed in a seat of the cover, around a central hole of the cover, wherein a shaft that is integral with the rotor passes through the hole.

4. A coupling device according to claim 2, wherein said driving member comprises a first tooth extending from a keyed tang on the rotor shaft end inside the chamber.

5. A coupling device according to claim 2, wherein said driven member comprises a first and a second tooth that are integrally formed with the working part and project from said bottom wall of the chamber in diametrically opposite positions.

6. A coupling device according to claim 5, wherein said elastic element is housed in a cylindrical crown portion between the teeth of said driven member.

7. A coupling device according to claim 6, wherein said cylindrical crown portion extends through an angle of slightly larger than 90°.

8. A coupling device according to claim 6, wherein said elastic element has rounded edges.

9. A coupling device according to claim 5, wherein said elastic element is placed in the chamber in a cylindrical crown portion which has a larger angular dimension than the elastic element dimension.

10. A coupling device according to claim 5, wherein the angular dimension of the two cylindrical crown portions delimited between the teeth of said driven member is different than each other.

11. A coupling device according to claim 10, wherein the elastic element is housed in the cylindrical crown portion which has the smaller angular dimension than the other cylindrical crown portion.

12. A coupling device according to claim 5, wherein a lubricant is poured into one of the cylindrical crown portions delimited by the teeth of said driven member.

13. A coupling device according to claim 12, wherein said lubricant is oil.

14. A coupling device according to claim 1, wherein said first motion transmission component is formed by the rotor.

15. A coupling device according to claim 1, wherein said second motion transmission component is formed by a centrifugal pump impeller.

16. A coupling device according to claim 1, wherein said elastic element is made of rubber.

17. A coupling device according to claim 1, wherein said elastic element is made of a synthetic-plastic material.

18. A coupling device according in claim 1, wherein the cover is snap-inserted in a circumferential recess placed at one end of the chamber at a height, with respect to the bottom wall, being lower than the axial development of the elastic element, so as to exert a compression thereof.

19. A coupling device according to claim 1, wherein the rotor comprises a cylindrical ring-like permanent magnet whereon a plastic-material element defining an inner tang and end flanges is overprinted.

* * * * *